United States Patent [19]

Pessel et al.

[11] 4,104,485
[45] Aug. 1, 1978

[54] TELEPHONE LOUD-SPEAKER SYSTEM

[76] Inventors: David Péssel, 14 Courtenay Cir., Pittsford, N.Y. 14534; Neil C. Wilhelm, 3631 Gleason Ave., San Jose, Calif. 95130

[21] Appl. No.: 667,129

[22] Filed: Mar. 15, 1976

[51] Int. Cl.² ............................................. H04M 1/00
[52] U.S. Cl. ............................. 179/1 HF; 179/1 HS; 179/81 B
[58] Field of Search ............... 179/81 B, 1 HS, 1 C, 179/2 C, 5 R, 161, 1 HF, 100 L

[56] References Cited
U.S. PATENT DOCUMENTS

| 3,011,024 | 11/1961 | Kastel | 179/1 HF |
| 3,156,771 | 11/1964 | Vaughn | 179/1 HS |
| 3,562,430 | 2/1971 | Faust | 179/1 C |

*Primary Examiner*—Kathleen H. Claffy
*Assistant Examiner*—Joseph A. Popek
*Attorney, Agent, or Firm*—Milton S. Sales

[57] ABSTRACT

A telephone loud-speaker system for use with telephones having a handset includes a chassis with a cradle for receiving the handset. The cradle is movable between a first position whereat the telephone's switch buttons are depressed, and a second position allowing the switch buttons to raise and actuate the telephone's electrical circuitry. Microphone, speaker and amplification devices permit use of the system without removing the handset from the cradle, without modification to telephone, and without requiring additional counter space.

4 Claims, 3 Drawing Figures

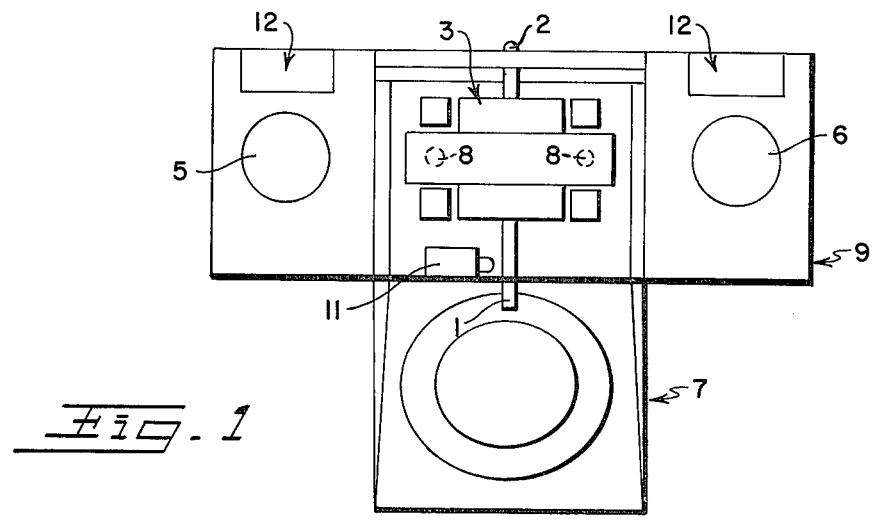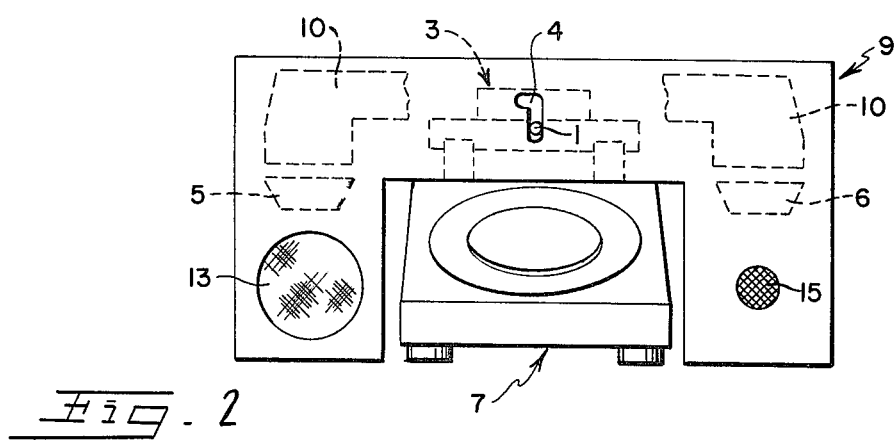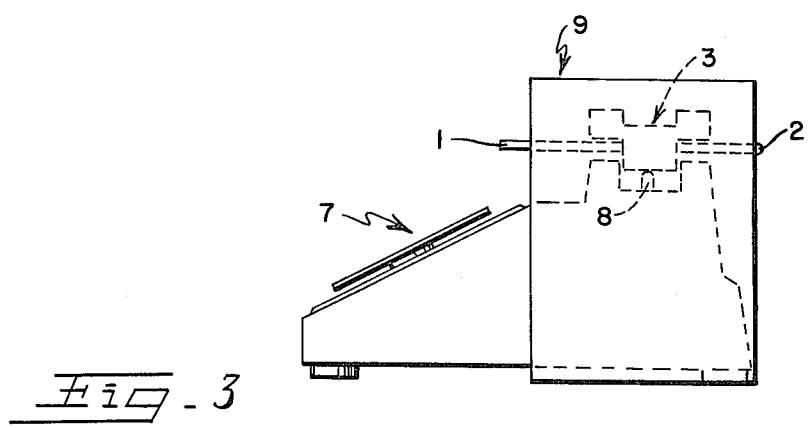

TELEPHONE LOUD-SPEAKER SYSTEM

PRIOR ART

Assemblies exist which permit the use of voice amplification circuitry with telephones. These are of two types: (1) devices which are electrically connected to the telephone circuitry and (2) devices which require placement of the telephone handset in a separate cradle each time the telephone is answered and the amplification is desired. The former type requires installation by telephone company personnel and must conform to the tariffs of the telephone company. It also requires a separate assembly from the telephone to house the electronics. The latter type requires the physical inconvenience of moving the handset and requires a large additional assembly to house the separate cradle and amplifier electronics.

SUMMARY OF THE INVENTION

This invention solves the problems inherent in the above mechanisms. It requires neither electrical attachments to the telephone nor a physically separate assembly for a cradle and/or electronics.

A cradle and electronics assembly is constructed so that it fits directly over the telephone without attachments. In one embodiment of this invention the handset is supported in a cradle subassembly which is attached to the main assembly by a pivot and control lever. The handset is positioned over two transducers connected to the electronic amplifier. The cradle subassembly is positioned in such a way that it may be switched into either of two modes: (1) the cradle subassembly swings freely on the pivot allowing normal operation of the telephone and the electronic amplifiers are maintained in an off state thereby conserving electrical power, making battery operation feasible; (2) the cradle subassembly is locked into a position which raises the handset, releases the handset switch buttons, and energizes the amplifier electronics. In this mode the telephone can be dialed and further used with communication via the electronic amplifiers and transducers without requiring that the user hold the handset.

BRIEF DESCRIPTION OF THE DRAWING

FIG. 1 is a top plan view of a preferred embodiment of the invention.

FIG. 2 is a front elevational view of the embodiment of the invention shown in FIG. 1.

FIG. 3 is a side elevational view of the embodiment of the invention shown in FIGS. 1 and 2.

DETAILED DESCRIPTION

FIGS. 1-3 show a preferred embodiment of the Telephone Loud-Speaker System. It consists of a chassis 9, to which are attached two transducers 5 and 6, a handset cradle 3, the latter via control lever 1 and pivot 2.

For normal operation of the telephone 7, control lever 1 is positioned in the vertical portion of slot 4 so that handset cradle 3 rests on handset switch buttons 8. Thus with telephone handset 10 resting in handset cradle 3 the handset switch buttons 8 are depressed. Raising the telephone handset 10 releases handset switch buttons 8 thereby allowing normal operation of the telephone 7.

However, when control lever 1 is moved to the horizontal section of slot 4, the handset cradle 3 is raised releasing handset switch buttons 8 and energizing amplifier electronics 12 by closing amplifier switch 11 thus allowing the telephone 7 to be operated such that received signals emanating from the telephone handset 10 are detected by receiver transducer 5, amplified by amplifier electronics 12 and broadcast on speaker 13. Simultaneously, speech detected by microphone 15 is amplified by amplifier electronics 12 and emitted from transmitter transducer 6, to be picked up by telephone handset 10. Amplifier electronics 12 is designed so that there is no interaction between speaker 13 and microphone 14.

Obviously many modifications and variations of the present invention are possible in the light of the above teachings. It is therefore to be understood that within the scope of the appended claims the invention may be practiced otherwise than as presently described.

What is claimed is:

1. Apparatus for use with a telephone of the type having a handset receivable on at least one spring-raised switch button when not in use to depress the switch button for controlling electrical operation of the telephone, said apparatus comprising:

a chassis;

a cradle, adapted to receive a telephone handset, mounted in said chassis for movement between a first position causing said switch button to assume its depressed position when a handset is received thereon, and a second position raising a received handset and causing said switch button to assume its raised position; and means for selectively moving said cradle from its first position to its second position when a handset is received thereon.

2. Apparatus as defined in claim 1 further comprising releasable latch means for retaining said cradle in its second position.

3. Apparatus as defined in claim 1 further comprising:

receiver and transmitter-transducers in said chassis in close proximity to a handset received by said cradle to, respectively, detect audio signals from said handset and provide audio signals to said handset.

4. Apparatus as defined in claim 1 wherein said cradle is movable to its first position by the weight of a received handset and to its second position by the switch button.

* * * * *